Sept. 29, 1936. R. F. PEO 2,055,983
AUTOMATIC TIRE INFLATION ATTACHMENT
Filed Jan. 23, 1935 3 Sheets-Sheet 3
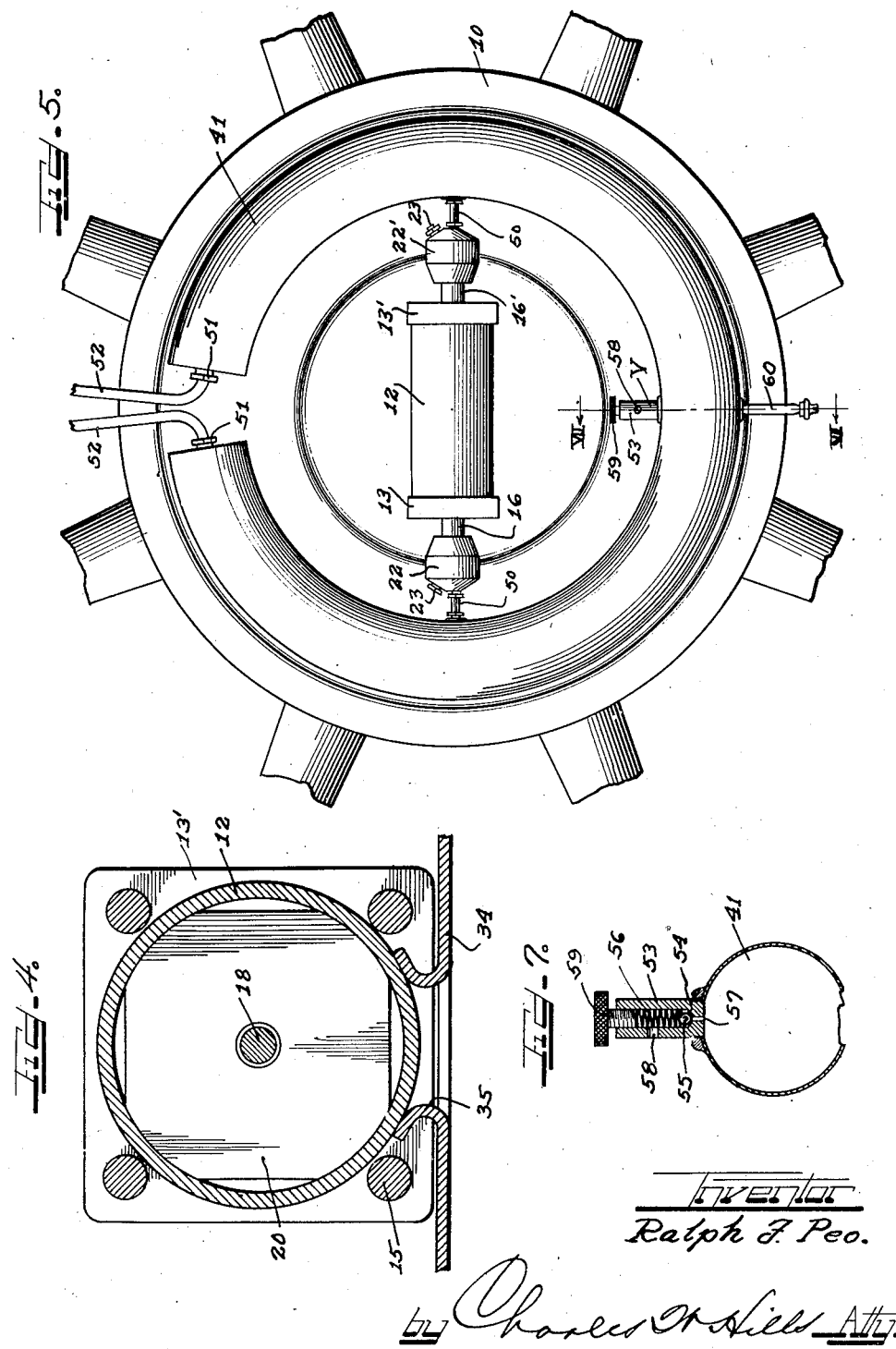
Inventor
Ralph F. Peo.
by Charles H. Hill Atty Patented Sept. 29, 1936

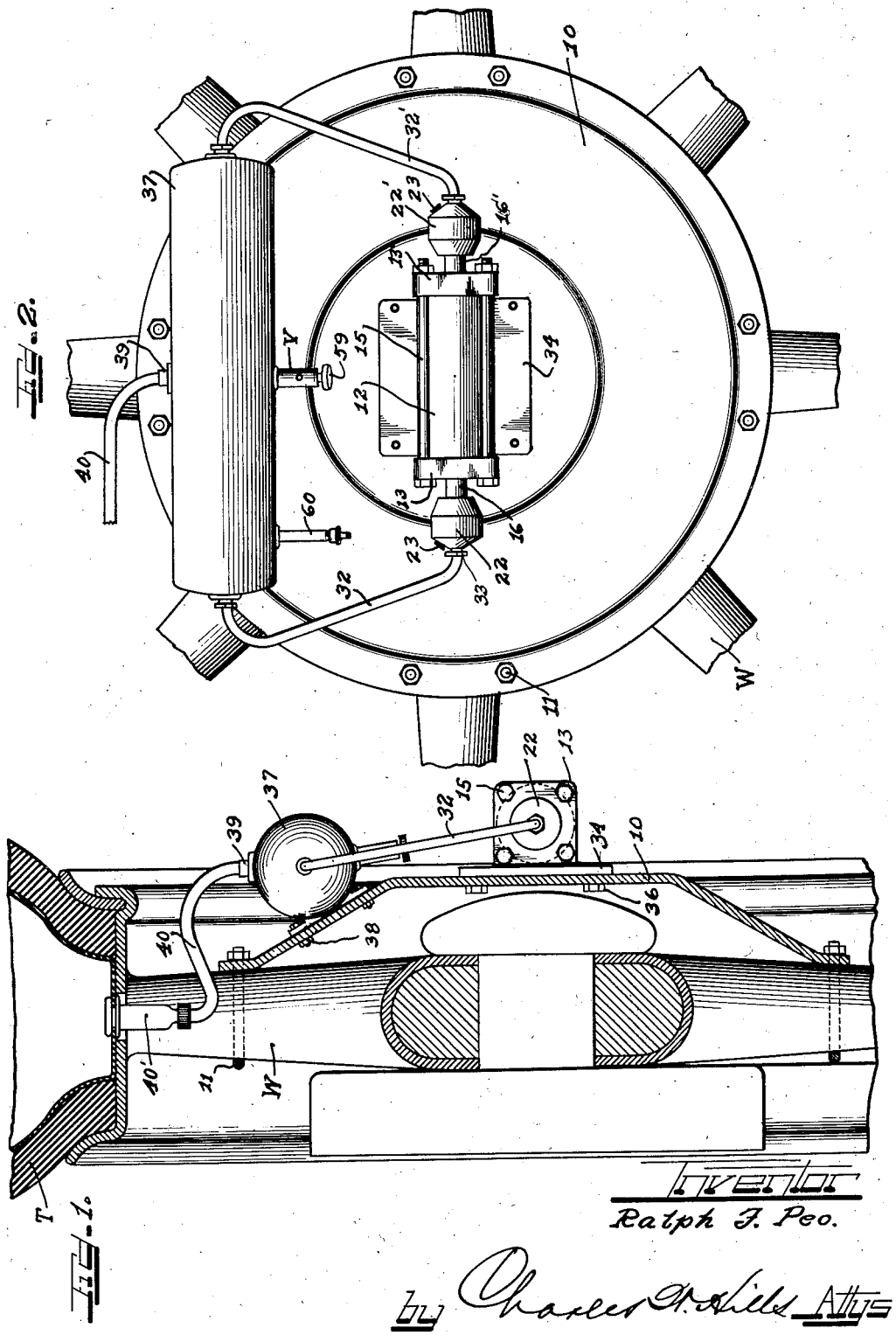

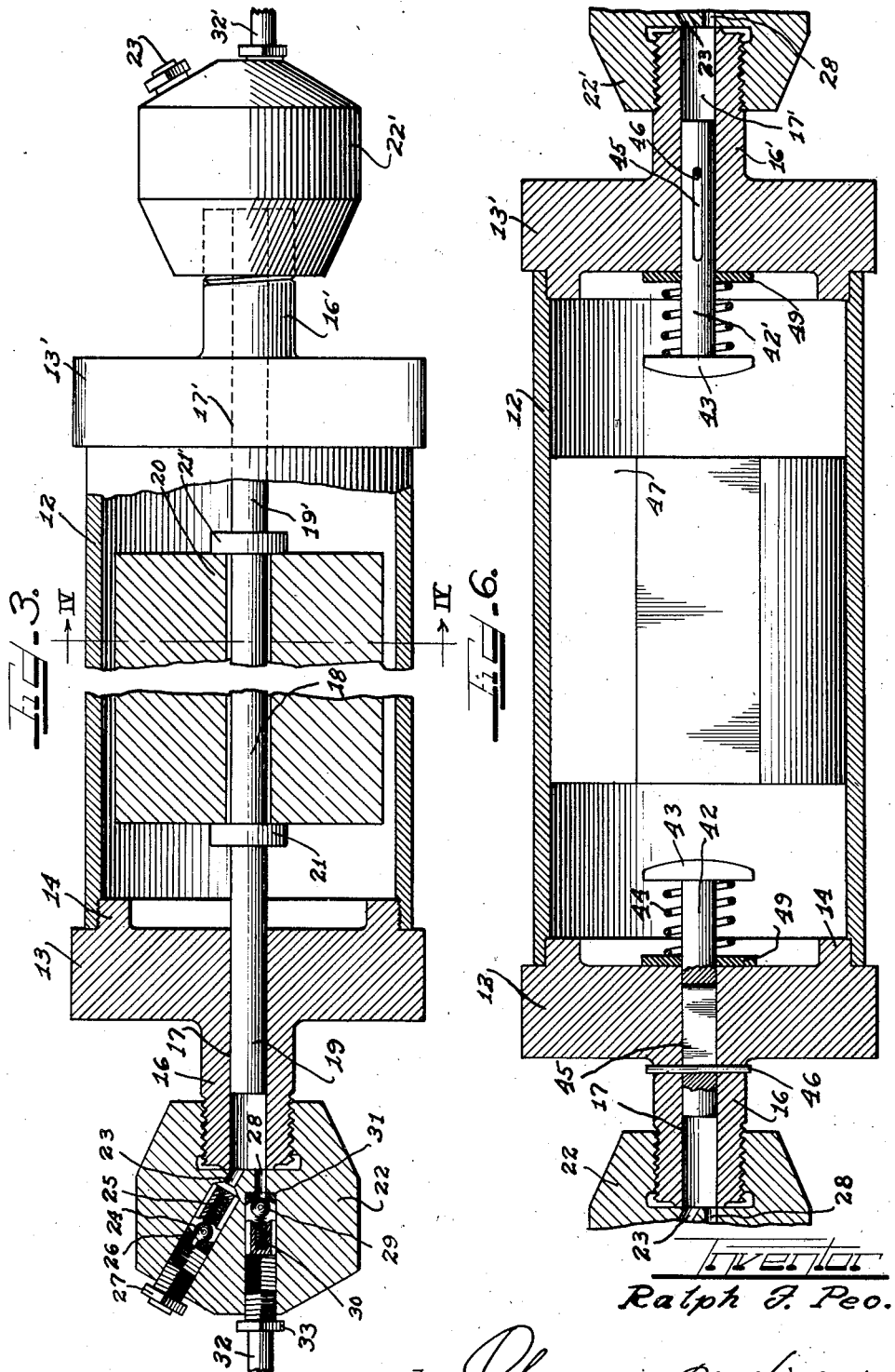

2,055,983

UNITED STATES PATENT OFFICE 2,055,983

AUTOMATIC TIRE INFLATION ATTACHMENT

Ralph F. Peo, Buffalo, N. Y., assignor to Houde Engineering Corporation, Buffalo, N. Y., a corporation of New York Application January 23, 1935, Serial No. 3,056

3 Claims. (Cl. 230—25)

This invention relates to the automatic inflation of pneumatic tires on vehicle wheels and covers particularly an improved pump structure and assembly which can be conveniently and readily mounted on a vehicle wheel for connection with the tire or tires thereon.

Heretofore, tire inflation attachments comprised a pump mounted on the vehicle wheel to rotate therewith and with its plunger positively actuated by engagement thereof with usually a cam element mounted on the axle or an axle support, such installation usually requiring mechanical modifications of the axle or its support in order to accommodate the cam element. An important object of my invention is to provide an air pump structure which is entirely self-energizing, with the pump frame mounted centrally on the wheel and with one or more pumping plungers operated by a weight which reciprocates in the pump frame solely in response to gravity as the wheel rotates.

Another important object is to interpose an air storage receptacle or tank between the pump and the tire and with the pump and tank mounted on a suitable support which can be readily detachably applied to the side of a wheel.

A further important object is to shape and arrange the pump structure and tank on a support to form a unitary structure which can be readily detachably applied to the side of a wheel and so that the center of gravity of the attachment structure will be at the wheel center line so as to eliminate any eccentric loading of the wheel.

The above referred to and other important features of the invention are incorporated in the structure disclosed on the accompanying drawings, on which drawings:

Figure 1 is a vertical diametral section of a wheel showing the inflation attachment applied thereto and with the supporting base of the attachment in section;

Figure 2 is a front elevation of the attachment and part of the wheel to which it is applied;

Figure 3 is an enlarged front elevation of the pump structure partly in vertical diametral section;

Figure 4 is a section on line IV—IV of Figure 3;

Figure 5 is a view similar to Figure 2 showing a modified structure and arrangement;

Figure 6 is a vertical diametral section of the pump structure of Figure 5; and

Figure 7 is a section on line VII—VII of Figure 5.

In the structure shown the supporting base 10 is a circular piece of sheet metal formed and shaped so that it may seat against the side of a wheel across the center portion thereof. The supporting base may be detachably secured in any suitable manner to the wheel to rotate therewith. I have shown a wheel W of the spoked type and the supporting base may be readily detachably secured by means of U-bolts 11 receiving the spokes.

The details of construction and operation of the pump structure shown in Figures 1 and 2 are clearly shown on Figures 3 and 4. The pump housing structure comprises a cylindrical shell 12 and end walls 13 and 13', each end wall having an annular lug or flange 14 extending inwardly therefrom to receive the cylindrical shell 12. The end walls may be rigidly secured to the cylindrical shell by threading, brazing, or welding, and additional security may be provided by extending clamping bolts 15 through the end walls outside of the shell to securely clamp the end walls to the shell ends.

Each end wall has an outward extension 16 coaxial therewith and the end wall and the extension is bored through to provide a pump cylinder space 17. A shaft 18 has its ends extending into the cylinder bores 17 and 17' in the end walls 13 and 13' respectively to form plungers 19 and 19'. A weight 20 is guided by and shiftable longitudinally in the cylindrical shell 12 and receives the central portion of the shaft 18, being confined thereto by abutment collars 21 and 21' secured to the shaft.

Secured to the extensions 16 and 16' on the ends 13 and 13', as by means of threading, are the heads 22 and 22' for supporting valving mechanism. Each head has a valve controlled air inlet and a valve controlled air discharge outlet for the respective cylinder bore 17 or 17'. Any suitable check valve structure may be employed. As shown the air inlet passageway 23 is controlled by a valve in the form of a ball 24 which is normally held seated by a spring 25 against a seat 26 in the passageway, this seat being preferably of cushioning material such as rubber. The seat may be supported at the inner end of a plug 27 threaded into the outer end of the inlet passage 23.

The outlet passage 28 in each head may be controlled by similar valve mechanism, a valve ball 29 being shown normally held by a spring 30 against a seat 31 which is preferably of cushioning material such as rubber. An outlet conduit or tube 32 is secured as by a plug 33 to the outer end of the outlet passage 28.

As the shaft 18 is reciprocated, the plunger ends 19 and 19' move inwardly and outwardly in the cylinder bores 17 and 17' respectively. During inward movement of a plunger the air will be drawn into the cylinder bore through the inlet passage 23 past the check valve 24, the valve in the outlet passage 28 being closed during such inward movement of the plunger. Upon outward movement of the plunger the inlet valve 24 will be closed and the outlet valve 29 will be opened so that the air may be driven from the cylinder bore in advance of the plunger and out through the tube 32. The pump structure shown is thus double acting, the plunger ends alternately drawing in air through the air inlets and driving it out through the air outlets.

The pumping action of the plunger ends is controlled by the movement of the shaft with the weight 20 in response to gravity as the wheel turns. The pump housing structure is mounted on the supporting base 10 in such position that its longitudinal axis will extend diametrally through the center line of the wheel and with the housing extending at opposite sides of the wheel center line so that the center of gravity of the housing structure will be in the center line of the wheel. When the shaft 18 is in a neutral position the weight 20 will be at the center portion of the pump structure housing and with its center of gravity in the center line of the wheel. Now, as the wheel rotates, the pump housing structure will rotate with the wheel and as its longitudinal axis approaches and reaches its vertical position the force of gravity acting on the weight will pull it downwardly and the shaft 18 will follow to project its lower plunger end outwardly in the corresponding cylinder bore for discharge of air therefrom through the corresponding discharge outlet.

The pump housing structure may be secured in any suitable manner to the supporting base 10. As shown, a plate 34 has ears 35 deflected therefrom which are welded or otherwise secured to the cylindrical shell 12 and this plate is secured, as by means of bolts or screws 36, to the supporting base 10 for support of the pump structure on the base.

Although the pump may be directly connected with one or more tires, I preferably interpose an air storage chamber or tank. On the arrangement of Figures 1 and 2 a storage tank 37 extends tangentially on the supporting base 10 and is detachably secured thereto as by means of bolts or screws 38. The outlet tubes 32 and 32' from the pump are shown connected with the ends of the tank and the outlet 39 of the tank is connected by a tube 40 with the air nipple 40' of the tire T. Where the wheel supports more than one tire all of the tires would be connected with the tank to receive air therefrom.

Figures 5 and 6 show a modified construction or arrangement. Here the tank 41 is annular and may be formed by bending a piece of pipe to circular form. The tank is secured to the base 10 so that when the base is secured to the wheel the tank will be concentric with the wheel. The housing structure for the pump is substantially the same as that for the pump shown in Figures 1 to 4 and the same reference characters are therefore applied to the parts of the housing structure valve connections.

Instead of having the pump plungers formed by the ends of a shaft which moves with the weight, as in the arrangement of Figures 1 to 4, the plungers in the modified arrangement of Figures 5 and 6 are separate and arranged to be struck or impacted by a weight 47 slidable in the cylindrical shell 12 between the plungers. The two plungers 42 and 42' each have an abutment head 43 at the inner end between which and the adjacent end wall 13 or 13' is interposed a spring 44 which tends to hold the plunger in the inner position. Suitable means are provided for limiting the movement of the plungers. As shown, each plunger has a longitudinal slot 45 through which extends a pin 46 supported in the extension or neck 16. The weight 47 reciprocates in the cylindrical shell 12 as the wheel rotates and when the longitudinal axis of the pump structure approaches vertical position the weight drops and strikes the lower plunger structure or outer shift of the plunger and forcing of air through the corresponding outlet passage 28. During downward movement of the weight, the upper plunger is pulled inwardly by its spring 44 and draws a charge of air through the air inlet 23 into the cylinder bore which air is discharged through the corresponding outlet 28 when the plunger is struck by the weight. The outward movement of the plunger is limited by the engagement of the plunger head with the corresponding end wall 13 or 13' and cushioning washers 49 of rubber, leather or other suitable material are provided for cushioning the engagement of the plunger head with the end walls.

The pump structure is secured to extend diametrally in the space surrounded by the annular tank 41, the outlets of the pump being connected by suitable fittings 50 with the tank at diametrally opposite points thereof. I have shown outlets 51 at the ends of the tank for connection by suitable conductors or tubes 52 with the pneumatic tires. If the wheel has one tire then only one outlet will be necessary. Where a wheel supports more than one tire there may be as many outlets for the tank as there are tires or branch tubes may run from a single outlet to the several tires.

The pump structures disclosed are entirely self-energizing as the wheel rotates, the pump plungers being operated by the weight as the weight is reciprocated by the force of gravity while the wheel is turning. In the arrangement of Figures 1 to 4 the plungers move at all times with the weight, while in the arrangement of Figures 5 and 6 separate plungers are operated by the impingement or hammer blow thereagainst by the reciprocating weight.

In order to determine the pressure at which a tire will be inflated by the pump structure, a suitable adjusting valve structure V is provided preferably on the tank structure. Referring to Figure 7, such valve structure is associated with the tank 41. It comprises a tube 53 providing a valve seat 54 for a check valve 55 which may be in the form of a ball as shown, this valve being normally held by a spring 56 against the seat to close the port 57 connecting the valve chamber with the tank, the tube 53 having the outer outlet passage 58. By means of a threaded plug 59 the resistance of the spring 56 against opening movement of the check valve can be adjusted and as soon as the pressure in the tank exceeds the predetermined pressure the check valve will be moved to open the outlet port 57 for escape of surplus air so that the tire will be maintained at a predetermined pressure. While the wheel is rotating and the pump is operating air will be pumped into the tank and the tire and until the pressure reaches a predetermined maximum, but thereafter no further air will flow into the tire but the air will flow from the tank past the check valve 55 and into the atmosphere. The valve V upon the tank on Figures 1 and 2 operates in the same manner as the valve associated with the tank 41 in the arrangement of Figures 5 and 6.

An inflation nipple 60 is provided for the storage tank, suitable check valve mechanism (not shown) being within the nipple to prevent outflow of air through the nipple from the tank unless the valve is positively opened. By means of this nipple the tank and tires connected therewith may be inflated by means of an ordinary hand pump or a power pump as when a new or repaired tire is applied to the wheel. After the tire has been thus inflated the automatic pump structure on the wheel will keep up the inflation pressure when the vehicle is driven.

In the arrangement of Figures 5 and 6, wherein an annular tank is provided and the symmetrical pump structure supported diametrically relative to the tank, the center of gravity of the inflation attachment assembly will be substantially in the center line of the wheel so that there will be no eccentric loading on the wheel.

I have shown a practical and efficient embodiment of the various features of my invention but I do not desire to be limited to the exact construction, arrangement and operation shown and described as changes and modifications may be made without departing from the scope of the invention.

I claim as my invention:

1. A rotary fluid pump of the class described comprising a pump frame adapted to rotate, a cylinder formed in said frame and having a fluid inlet and a fluid outlet, a plunger for said cylinder, and a weight within said frame disconnected from said plunger structure but shiftable during rotation of the frame for impact engagement with the plunger whereby the plunger exerts pumping action for the discharge of fluid from the cylinder.

2. A rotary fluid pump of the class described comprising a frame secured to rotate, cylinders in the opposite ends of said frame, said cylinders having fluid inlets and outlets, a plunger operable in each cylinder for discharging fluid therefrom, yielding means normally tending to hold said plungers outwardly in the cylinder, and a weight within said frame disconnected from said plungers but shiftable in said frame for alternate impact engagement with the plungers during rotation of the frame whereby said plungers exert pumping action for discharging fluid.

3. A rotary fluid pump comprising a frame adapted to rotate, cylinders extending from the interior of said frame and having fluid inlets and outlets, a piston structure operable in each cylinder, yielding means normally tending to hold said piston structures outwardly in the cylinders, and a weight within said frame disconnected from said piston structures but shiftable in said frame for impact engagement with said piston structures during rotation of the frame whereby said piston structures will exert pumping action for discharging fluid from the cylinders.

RALPH F. PEO.